(12) United States Patent
Kim et al.

(10) Patent No.: US 12,475,052 B2
(45) Date of Patent: Nov. 18, 2025

(54) MEMORY SYSTEMS AND METHODS FOR OPERATING MEMORY SYSTEMS

(71) Applicant: Samsung Electronics Co., Ltd., Suwon-si (KR)

(72) Inventors: Daehoon Kim, Gimpo-si (KR); Hyungwon Park, Daegu (KR); Jin Jung, Suwon-si (KR); Minho Kim, Daegu (KR); Jin In So, Suwon-si (KR); Jong-Geon Lee, Suwon-si (KR); Hwanjun Lee, Daegu (KR); Minwoo Jang, Daegu (KR); Yeaji Jung, Busan (KR)

(73) Assignees: Samsung Electronics Co., Ltd., Suwon-si (KR); Daegu Gyeongbuk Institute of Science and Technology, Daegu (KR)

( * ) Notice: Subject to any disclaimer, the term of this patent is extended or adjusted under 35 U.S.C. 154(b) by 0 days.

(21) Appl. No.: 18/604,783

(22) Filed: Mar. 14, 2024

(65) Prior Publication Data
US 2025/0077433 A1   Mar. 6, 2025

(30) Foreign Application Priority Data
Sep. 1, 2023   (KR) .................. 10-2023-0116307

(51) Int. Cl.
*G06F 12/0862* (2016.01)
(52) U.S. Cl.
CPC .................. *G06F 12/0862* (2013.01)
(58) Field of Classification Search
CPC .................................... G06F 12/0862
See application file for complete search history.

(56) References Cited

U.S. PATENT DOCUMENTS

| 8,762,968 B2 | 6/2014 | Chen et al. |
| 9,071,246 B2 | 6/2015 | Subramaniam et al. |

(Continued)

FOREIGN PATENT DOCUMENTS

| KR | 20150114958 A | 10/2015 |
| KR | 20230069139 A | 5/2023 |

OTHER PUBLICATIONS

"A. Maruf, A. Ghosh, J. Bhimani, D. Campello, A. Rudoff and R. Rangaswami, "Multi-Clock: Dynamic Tiering for Hybrid Memory Systems," 2022 IEEE International Symposium on High-Performance Computer Architecture (HPCA), Seoul, Korea, Republic of, 2022, pp. 925".

(Continued)

*Primary Examiner* — Prasith Thammavong
(74) *Attorney, Agent, or Firm* — Wolf, Greenfield & Sacks, P.C.

(57) ABSTRACT

Memory systems and methods for operating the same. A memory system comprises a first memory, a second memory having an operating speed different from that of the first memory, a storage unit configured to store an instruction, a prefetcher configured to update prefetcher data in response to occurrence of cache hits and a processor configured to execute the instruction stored in the storage unit. When the instruction is executed, the processor is configured to generate prefetcher friendly data by filtering the prefetcher data, set a prefetcher friendly bit in a first pointer area corresponding to the first memory and a second pointer area corresponding to the second memory based on the prefetcher friendly data, and determine whether data of the first pointer area and the second pointer area are migrated, in consideration of a reference bit and the prefetcher friendly bit of the first and second pointer areas.

20 Claims, 12 Drawing Sheets

(56) References Cited

U.S. PATENT DOCUMENTS

| | | | |
|---|---|---|---|
| 9,472,248 B2 | 10/2016 | Wilkerson et al. | |
| 9,671,857 B2 | 6/2017 | Vanka et al. | |
| 2010/0281221 A1* | 11/2010 | Cantin | G06F 12/0813 |
| | | | 711/132 |
| 2021/0089457 A1* | 3/2021 | Park | G06F 16/23 |
| 2023/0229596 A1* | 7/2023 | Shulyak | G06F 12/0862 |
| | | | 711/137 |
| 2024/0028516 A1* | 1/2024 | Maroncelli | G06F 12/0862 |

OTHER PUBLICATIONS

"Hasan Al Maruf, et al., "TPP: Transparent Page Placement for CXL-Enabled Tiered-Memory," ASPLOS '23, Mar. 25-29, 2023, Vancouver, BC, Canada".
"Yaebin Moon, et al., "ADT: Aggressive Demotion and Promotion for Tiered Memory," IEEE Computer Architecture Letters, vol. 22, No. 1, Jan.-Jun. 2023".
"Zi Yan et al., "Nimble Page Management for Tiered Memory Systems," ASPLOS '19, Apr. 13-17, 2019, Providence RI".

\* cited by examiner

FIG. 7

| rb / pfb | 1 | 0 |
|---|---|---|
| 1 | S | S |
| 0 | F | S |

FIG. 9

| rb / pfb | 1 | 0 |
|---|---|---|
| 1 | S | S |
| 0 | F | S |

MEMORY SYSTEMS AND METHODS FOR OPERATING MEMORY SYSTEMS

CROSS-REFERENCE TO RELATED APPLICATION

This application claims priority and all the benefits accruing therefrom under 35 U.S.C. § 119 from Korean Patent Application No. 10-2023-0116307 filed on Sep. 1, 2023, in the Korean Intellectual Property Office, and the entire contents of the above-identified application are herein incorporated by reference.

BACKGROUND

Technical Field

The present disclosure relates to memory systems and to methods for operating memory systems.

Description of the Related Art

As the memory usage of applications in a data center is increased, it is increasingly desirable to have or build large memory systems. Accordingly, some large memory systems can be built using a heterogeneous memory system that uses a storage class memory or a compute express link (CXL) memory together with a DRAM. However, in case of a heterogeneous memory environment, since performance is different for each memory type, the execution time of applications may be minimized in such a manner that hot pages frequently accessed by the applications are stored or held in a relatively fast memory and cold pages less accessed by the applications are stored or held in a relatively slow memory. A memory system, or a data processing system, which includes a data storage device, may be more competitive as it stores more data in the data storage device, stores data in the data storage device more quickly, and outputs data stored in the data storage device more quickly.

BRIEF SUMMARY

Some objects of the present disclosure include providing memory systems in which delay times are reduced.

Some objects of the present disclosure include providing methods for operating memory systems in which delay times are reduced.

The objects of the present disclosure are not limited to those mentioned above and additional objects of the present disclosure, which are not mentioned herein, will be understood more clearly by those skilled in the art from the following description of the present disclosure.

According to some aspects of the present disclosure, there is provided a memory system comprising a first memory, a second memory having an operating speed different from that of the first memory, a storage unit configured to store an instruction, a prefetcher configured to update prefetcher data in response to occurrence of cache hits and a processor configured to execute the instruction stored in the storage unit. When the instruction is executed by the processor, the processor may be configured to generate prefetcher friendly data by filtering the prefetcher data, set a prefetcher friendly bit in a first pointer area corresponding to the first memory and a second pointer area corresponding to the second memory based on the prefetcher friendly data, and determine whether data of the first pointer area and the second pointer area are migrated, in consideration of a reference bit and the prefetcher friendly bit of the first and second pointer areas.

According to some aspects of the present disclosure, there is provided a method for operating a memory system comprising a first memory and a second memory having an operating speed different from that of the first memory, the method comprising, updating prefetcher data by a prefetcher in response to occurrence of cache hits, generating, by a monitoring module, prefetcher friendly data by filtering the prefetcher data, and providing, by the monitoring module, the generated prefetcher friendly data to a migration module, setting, by the migration module, a prefetcher friendly bit in a first pointer area corresponding to the first memory and a second pointer area corresponding to the second memory based on the prefetcher friendly data, and determining, by the migration module, whether data of the first pointer area and the second pointer area are migrated, in consideration of a reference bit and the prefetcher friendly bit of the first and second pointer areas.

According to some aspects of the present disclosure, there is provided a method for operating a memory system comprising a first memory and a second memory having an operating speed different from that of the first memory, the method comprising, updating prefetcher data by a prefetcher in response to occurrence of cache hits, updating, by a migration module, a prefetcher friendly bit indicating whether a value of the cache hits occurring in a first pointer area corresponding to the first memory and a second pointer area corresponding to the second memory is equal to or greater than a threshold value and determining, by the migration module, whether data of the first pointer area and the second pointer area are migrated, in consideration of a reference bit indicating data in the first or second memory has been referenced and the prefetcher friendly bit.

BRIEF DESCRIPTION OF THE DRAWINGS

FIG. 7 is a view illustrating the demotion operation of FIG. 6.

FIG. 9 is a view illustrating the promotion operation of FIG. 8.

DETAILED DESCRIPTION

Figure 1:
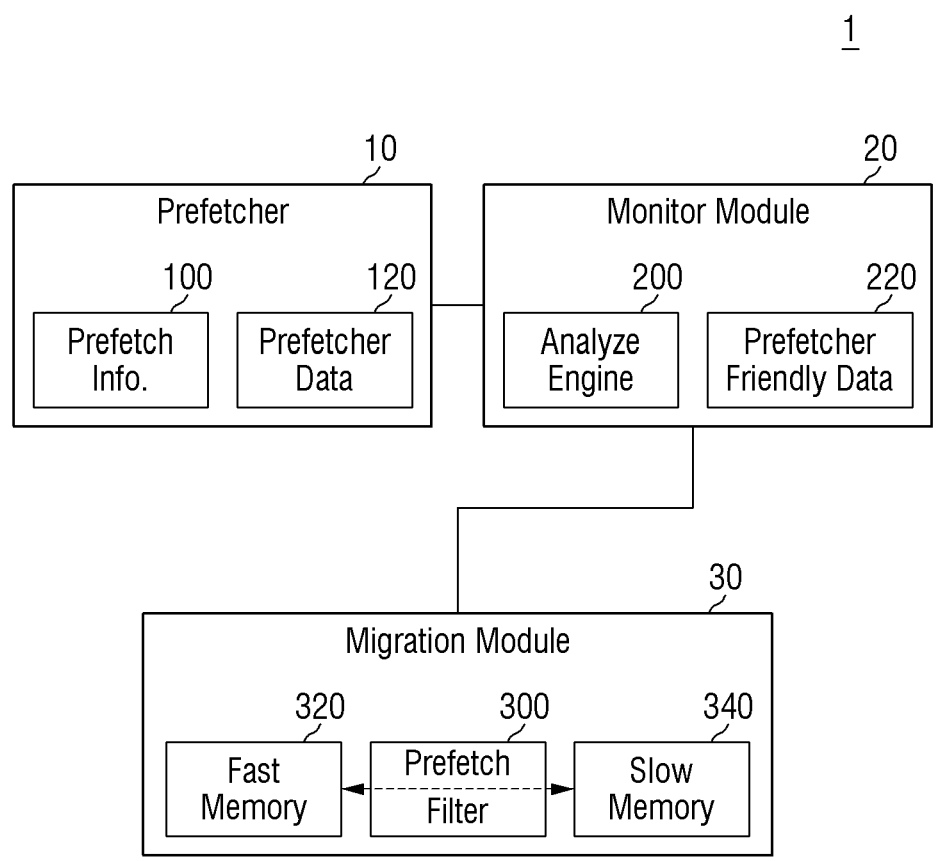
FIG. 1 is a block diagram illustrating a memory system according to some embodiments of the present disclosure.

Terms such as "unit" and "module" used in the present disclosure or functional blocks shown in the drawings may be implemented in the form of hardware, software, and/or a combination thereof that is configured to perform a specific function.

Hereinafter, a memory system and a method for operating the memory system according to some embodiments will be described with reference to the accompanying drawings.

FIG. 1 is a block diagram illustrating a memory system according to some embodiments of the present disclosure.

Referring to FIG. 1, a memory system 1 may include a prefetcher 10, a monitor module 20 and a migration module 30. In addition, the memory system 1 may include a storage unit (not shown) configured to store instructions and a processor (not shown) configured to execute instructions.

The prefetcher 10 may be included in a processor (not shown). For example, the prefetcher 10 may be configured in hardware, but the present disclosure is not limited thereto. For example, the prefetcher 10 may be implemented in software.

The prefetcher 10 may predict a memory area, which is likely to be accessed next, by using a memory access pattern of an application. The prefetcher 10 may read data from a memory to a cache memory inside the processor (not shown) in advance based on the prediction.

The prefetcher 10 may include prefetch information 100 and prefetcher data 120. The prefetch information 100 may include address (ADDR) and hit information of prefetched data. The number of hits in the prefetched data through the prefetch information 100 may be recorded in the prefetcher data 120. The prefetch information 100 and the prefetcher data 120 will be described in greater detail with reference to FIG. 2.

The monitor module 20 may include an analysis engine 200 and a prefetcher friendly data 220. The monitor module 20 may analyze the prefetcher data 120 through the analysis engine 200. The monitor module 20 may store the prefetcher friendly data 220 generated in accordance with the result of the analysis engine 200. In the present disclosure, a memory area, which is highly likely to be loaded into the processor (not shown) in advance through the prefetcher 10, will be defined as a prefetcher friendly (PF) memory area. A process of generating the prefetcher friendly data 220 will be described in greater detail later with reference to FIG. 2.

The memory system 1 may include a first memory (not shown) and a second memory (not shown). The migration module 30 may include a first pointer area 320 corresponding to the first memory (not shown). The migration module 30 may include a second pointer area 340 corresponding to the second memory (not shown). An operating speed of the first memory (not shown) may be different from that of the second memory (not shown).

In some embodiments, the memory system 1 may have a heterogeneous memory environment. For example, the operating speed of the first memory (not shown) may be relatively faster than that of the second memory (not shown). For example, the first memory (not shown) may be a DRAM, and the second memory (not shown) may be a CXL.

The migration module 30 may migrate a memory in consideration of prefetcher affinity and activation states of data included in the first pointer area 320 and the second pointer area 340.

The migration module 30 may include a prefetch filter 300. The prefetch filter 300 may designate a prefetcher friendly bit pfb with respect to a plurality of first areas (see 3200 of FIG. 3) and a plurality of second areas (see 3400 of FIG. 3), which are included in the first pointer area 320 and the second pointer area 340, based on the prefetcher friendly data 220 received from the monitor module 20.

A method for migrating a memory by referring to the prefetcher friendly bit pfb and a reference bit rb by the migration module 30 will be described in greater detail later.

Figure 2:
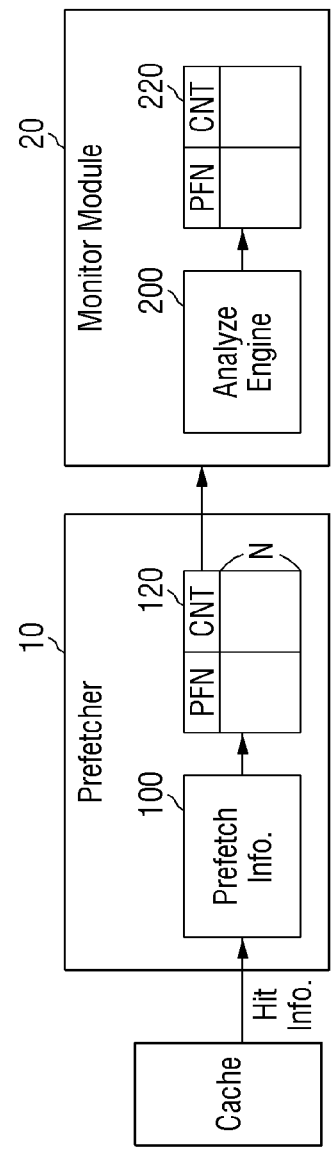
FIG. 2 is a view illustrating a prefetcher and a monitor module in the memory system shown in FIG. 1.

FIG. 2 is a view illustrating a prefetcher and a monitor module in the memory system shown in FIG. 1.

Referring to FIG. 2, the prefetcher 10 and the monitor module 20 may classify and record the prefetcher friendly memory area by analyzing the memory access pattern of the processor (not shown).

When a memory prefetch occurs by the prefetcher 10, the prefetcher 10 may store a corresponding memory address. The hit information may correspond to data indicating whether an application has accessed the prefetched memory address.

The prefetch information 100 may include an address addr of a memory in which prefetch occurs and hit information of data included in the corresponding address. For example, the hit information may be recorded in the form of an event.

The prefetcher data 120 may include a page frame number PFN and a count value CNT. The page frame number may correspond to a portion of the memory address addr in which prefetch occurs. The count means the number of times that cache hits have occurred with respect to data corresponding to the corresponding page frame number.

In some embodiments, the prefetcher data 120 may be recorded in accordance with a Misra-Gries Algorithm. The Misra-Gries Algorithm corresponds to an algorithm used to find an element most frequently appearing in a specific data pattern by using a table of a fixed size. The table used in the Misra-Gries Algorithm may correspond to a table of a key-value format. That is, different values may exist depending on a specific key value. As a certain element is found, the table may be updated. In this case, when an element matched with a key value of the corresponding element exists in the table, a value according to the corresponding key is increased by 1. When an element matched with the key value of the corresponding element does not exist in the table and there is an empty space in the table, the corresponding key value may be added to the table. However, when an element matched with the key value of the corresponding element does not exist in the table and there is no empty space in the table, values of all the elements are reduced by 1. When values of some elements reach zero (0) that is a threshold value, the corresponding element may be removed from the table. For example, the prefetcher data 120 included in some embodiments of the present disclosure may have N number of key values. As a size of the prefetcher data 120 is limited, a size of hardware may be prevented from being increased.

The monitor module 20 may include an analysis engine 200 and a prefetcher friendly data 220.

The data processed by analyzing the prefetcher data 120 in the analysis engine 200 may be recorded in the prefetcher friendly data 220. The prefetcher friendly data 220 may include a page frame number PFN and a count value CNT. The prefetcher friendly data 220 may correspond to data, which have a count value equal to or greater than a preset threshold value, among the prefetcher data 120. Therefore, only a memory area having the highest prefetcher affinity may be classified.

Figure 3:
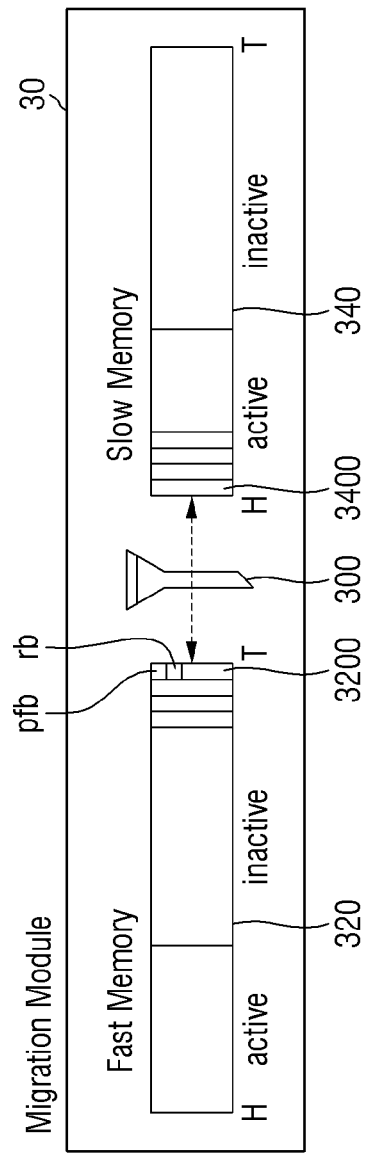
FIG. 3 is a view illustrating the migration module in the memory system shown in FIG. 1.

FIG. 3 is a view illustrating the migration module in the memory system shown in FIG. 1.

Referring to FIG. 3, the migration module 30 may include a prefetch filter 300, a first pointer area 320 and a second pointer area 340. The first pointer area 320 may correspond to the first memory (not shown). The second pointer area 340 may correspond to the second memory (not shown). The first pointer area 320 may include a plurality of first areas 3200. The first area 3200 may correspond to a first page (not shown) included in the first memory (not shown). The second pointer area 340 may include a plurality of second areas 3400. The second area 3400 may correspond to a second page (not shown) included in the second memory (not shown).

The first pointer area 320 may include a first active area and a first inactive area. The second pointer area 340 may include a second active area and a second inactive area. The active area may correspond to an area in which a lot of access occurs by the processor (not shown). The inactive area may correspond to an area where a lot of access does not occur by the processor (not shown). The active area may correspond to an area in which a relatively higher number of accesses occurs by the processor (not shown). The inactive area may correspond to an area where a relatively lower number of accesses occurs by the processor (not shown).

When access by the processor (not shown) does not occur with respect to data corresponding to the first area 3200 and the second area 3400, or occurs relatively infrequently, the first area 3200 and the second area 3400 may move from the active area toward the inactive area.

As the first area 3200 and the second area 3400, which are included in the first pointer area 320 and the second pointer area 340, are frequently referenced, the first area 3200 and the second area 3400 may be positioned at a head H of the first pointer area 320 and the second pointer area 340. On the other hand, as the first area 3200 and the second area 3400, which are included in the first pointer area 320 and the second pointer area 340, are not frequently referenced, the first area 3200 and the second area 3400 may be positioned at a tail T of the first pointer area 320 and the second pointer area 340.

The plurality of first areas 3200 and the plurality of second areas 3400, which are included in the first pointer area 320 and the second pointer area 340, may include a prefetcher friendly bit pfb and a reference bit rb, respectively.

The prefetcher friendly bit pfb may be a bit for displaying the plurality of first areas 3200 and the plurality of second areas 3400, which are included in the first pointer area 320 and the second pointer area 340, which are prefetcher friendly. For example, when the prefetcher friendly bit pfb does not correspond to the prefetcher friendly area, its value may be 0. On the other hand, when the prefetcher friendly bit pfb corresponds to the prefetcher friendly area, its value may be 1. However, the embodiments of the present disclosure are not limited to the above example. In some embodiments of the present disclosure, the prefetcher friendly bit of the prefetcher friendly area may be 0, and the prefetcher friendly bit of the prefetcher non-friendly area may be 1.

The reference bit rb may be a bit indicating whether data in the first memory (not shown) and/or the second memory (not shown), which corresponds to the first pointer area 320 and the second pointer area 340, are referenced. For example, when a page of a memory corresponding to the first area 3200 is not referenced by the processor (not shown), a value of the reference bit rb may be 0. On the other hand, when the page of the memory corresponding to the first area 3200 is referenced by the processor (not shown), the value of the reference bit rb may be 1. However, the embodiments of the present disclosure are not limited to the above example. In some embodiments of the present disclosure, the reference bit of the area referenced by the processor may be 0, and the reference bit of the area that is not referenced by the processor may be 1.

In the present disclosure, migration of a page of a fast memory to a slow memory will be referred to as Demotion. Migration of a page of the slow memory to the fast memory will be referred to as Promotion.

The migration module 30 may perform demotion and promotion. In some embodiments, the first area 3200 positioned at the tail T of the first pointer area 320 may be subjected to demotion to the second pointer area 340. In addition, the second area 3400 positioned at the head H of the second pointer area 340 may be subjected to promotion to the first pointer area 320. A process of performing demotion and promotion by the migration module 30 will be described below with reference to FIG. 4.

Figure 4:
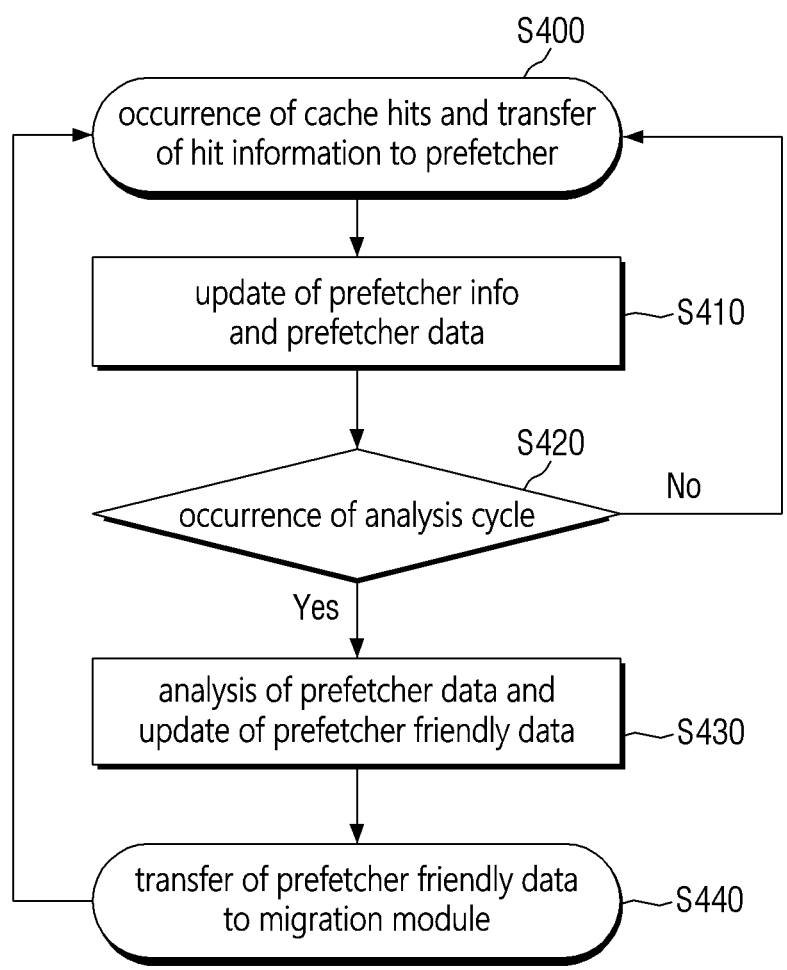
FIG. 4 is a flow chart illustrating an operation of the prefetcher and the monitor module, which are shown in FIG. 2.

FIG. 4 is a flow chart illustrating an operation of the prefetcher and the monitor module, which are shown in FIG. 2.

Referring to FIGS. 2 and 4, when an application accesses a prefetched memory address, cache hits may occur, and hit information may be transferred to the prefetcher 10 in accordance with the cache hits (operation S400).

As a result, the prefetch information 100 and the prefetcher data 120 may be sequentially updated (operation S410).

A method for generating the prefetch information 100 and the prefetcher data 120 is the same as that described above.

The monitor module 20 may determine whether an analysis cycle of the prefetcher data 120 has occurred (operation S420).

The monitor module 20 may transfer an instruction language for retrieving the prefetcher data 120 from the prefetcher 10, to the processor (not shown). For example, the monitor module 20 may transfer the instruction language for retrieving the prefetcher data 120 in accordance with a predetermined cycle. The monitor module 20 may determine whether an analysis cycle occurs depending on whether the instruction language has occurred.

When the analysis cycle does not occur (No branch from operation S420), a process of updating the prefetch information 100 and the prefetcher data 120 is repeated as the cache hits occur.

When the analysis cycle occurs (Yes branch from operation S420), the monitor module 20 may analyze the prefetcher data 120 received from the prefetcher 10 by the analysis engine 200 and may update the prefetcher friendly data 220 (operation S430).

As the analysis cycle occurs, the monitor module 20 may receive the prefetcher data 120 from the prefetcher 10. The analysis engine 200 may analyze the prefetcher data 120. For example, when the preset threshold value for the count value of the prefetcher data 120 is X, the data having the count value of X or less may not be recorded in the prefetcher friendly data 220, and only the data having the count value exceeding X may be recorded in the prefetcher friendly data 220.

As a result, only a memory area having the highest prefetcher affinity may be classified.

The updated prefetcher friendly data 220 may be transferred to the migration module 30 in accordance with a predetermined cycle (operation S440).

After the prefetcher friendly data 220 is transferred to the migration module 30, the process of updating the prefetch information 100 and the prefetcher data 120 may be repeated in accordance with the cache hits (operation S400).

Figure 5:
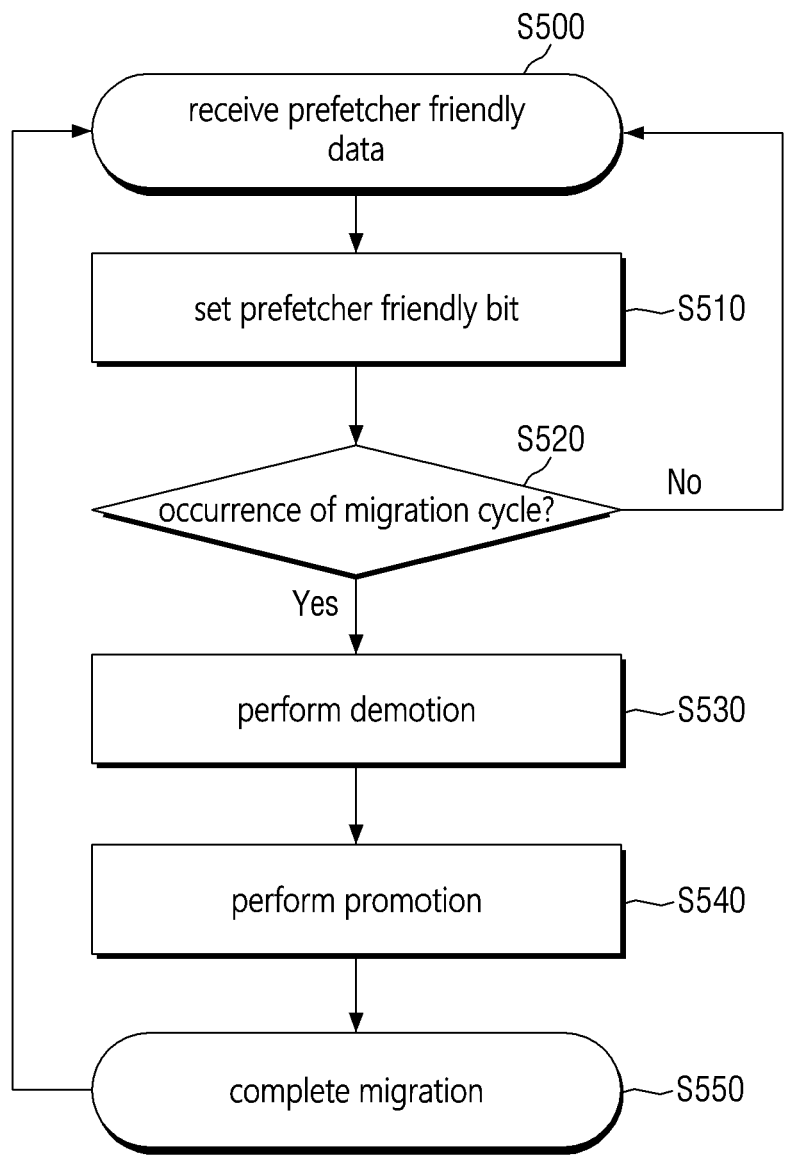
FIG. 5 is a flow chart illustrating an operation of the migration module shown in FIG. 3.

FIG. 5 is a flow chart illustrating an operation of the migration module shown in FIG. 3.

Referring to FIGS. 1, 3 and 5, the migration module 30 may receive the prefetcher friendly data 220 from the monitor module 20 (operation S500). For example, the migration module 30 may receive the prefetcher friendly data 220 from the monitor module 20 in accordance with a predetermined cycle.

The prefetch filter 300 may set the prefetcher friendly bit pfb in the plurality of first areas 3200 and the plurality of second areas, which are prefetcher friendly, with reference to the prefetcher friendly data 220 (operation S510).

For example, when the prefetcher friendly bit pfb does not correspond to the prefetcher friendly area, its value may be 0. On the other hand, when the prefetcher friendly bit pfb corresponds to the prefetcher friendly area, its value may be 1. However, the embodiments of the present disclosure are not limited to the above example. In some embodiments of the present disclosure, the prefetcher friendly bit of the prefetcher-friendly area may be 0, and the prefetcher friendly bit of the prefetcher non-friendly area may be 1.

The migration module 30 may determine whether a migration cycle has occurred (operation S520). That is, the migration may be repeated in accordance with a predetermined cycle.

When the migration cycle has not occurred (No branch from operation S520), the migration module 30 may continue to receive the prefetcher friendly data 220 from the monitor module 20 (S500) and thus may set the prefetcher friendly bit pfb (S510).

On the other hand, when the migration cycle has occurred (Yes branch from operation S520), the migration module 30 may perform migration between the first pointer area 320 and the second pointer area 340. The migration may include promotion and demotion.

The migration module 30 performs demotion (operation S530).

In some embodiments, the migration module 30 may determine whether to perform demotion with respect to the first area 3200 positioned at the tail T of the first pointer area 320. A more detailed process of demotion will be described below with reference to FIG. 6. The migration module 30 that has completed demotion may perform promotion (operation S540).

In some embodiments, the migration module 30 may determine whether promotion is performed with respect to the second area 3400 positioned at the head H of the second pointer area 340. A more detailed process of promotion will be described below with reference to FIG. 8.

When the migration module 30 completes promotion, migration may be completed (operation S550).

The migration module 30 that has completed migration may receive the prefetcher friendly data 220 from the monitor module 20 (operation S500), and may repeat the above process.

Figure 6:
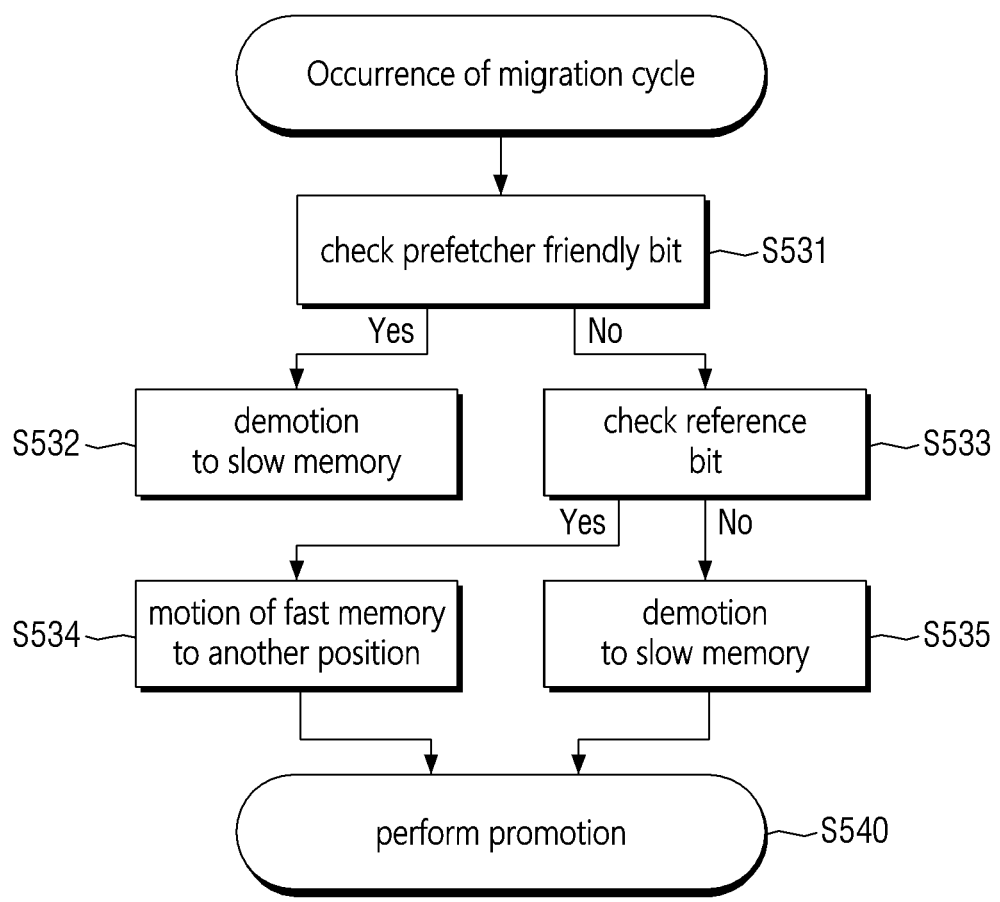
FIG. 6 is a flow chart illustrating a demotion operation of the operation of the migration module shown in FIG. 5.
Figure 7:
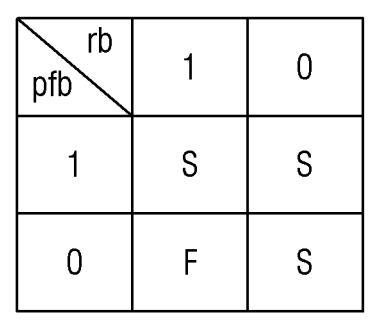

FIG. 6 is a flow chart illustrating a demotion operation of the operation of the migration module shown in FIG. 5. FIG. 7 is a view illustrating the demotion operation of FIG. 6.

Referring to FIGS. 3, 6 and 7, when the migration cycle occurs, the migration module 30 may determine whether to perform demotion with respect to the first area 3200 positioned at the tail T of the first pointer area 320.

First, the migration module 30 may preferentially check the prefetcher friendly bit pfb of the first area 3200 positioned at the tail T of the first pointer area 320 (operation S531).

In the following description, in case of an area having high prefetcher affinity, the value of the prefetcher friendly bit pfb is defined as 1, and in case of an area having low prefetcher affinity, the value of the prefetcher friendly bit pfb is defined as 0. In case of the area referenced by the processor (not shown), the value of the reference bit rb is defined as 1, and in case of the area that is not referenced by the processor (not shown), the value of the reference bit rb is defined as 0. However, in the present disclosure, both the prefetcher friendly bit pfb and the reference bit rb may be set differently.

When the value of the prefetcher friendly bit pfb of the first area 3200 is 1 (Yes branch from operation S531), the first area 3200 is subjected to demotion to any position of the second pointer area 340 regardless of the value of the reference bit rb (operation S532) (the case that the pfb value of FIG. 7 is 1). This is because that performance degradation due to demotion may be minimized as the first area 3200 corresponds to an area having high prefetcher affinity even though the first area 3200 is subjected to demotion to the second pointer area 340 corresponding to a slow memory when the prefetcher friendly bit pfb is 1.

When the value of the prefetcher friendly bit pfb of the first area 3200 is 0, the reference bit rb is checked (operation S533).

When the value of the reference bit rb is 1 (Yes branch from operation S533), the data of the first area 3200 corresponds to the data referenced by the processor (not shown) and thus moves to another position of the first pointer area 320 (operation S534) (the case that the pfb value of FIG. 7 is 0 and the rb value is 1). That is, demotion is not performed. Therefore, when the processor (not shown) accesses the same data later, faster access may be made.

When the value of the reference bit rb is 0 (No branch from operation S533), the first area 3200 is subjected to demotion to the second pointer area 340 (operation S535) (the case that the pfb value of FIG. 7 is 0 and the rb value is 0). This is because that the data of the first area 3200 is not required to be positioned in a fast memory as the data of the first area 3200 corresponds to the data that is not referenced by the processor (not shown) when the reference bit rb is 0.

The migration module 30 may perform promotion after completing demotion (operation S540).

In this way, the migration module 30 may perform demotion by preferentially determining the prefetcher friendly memory area, thereby making sure of capacity of the fast memory. Also, the prefetcher may be used so that performance degradation due to data subjected to demotion to the slow memory may be minimized. Therefore, performance of the processor may be improved in a heterogeneous memory environment.

Figure 8:
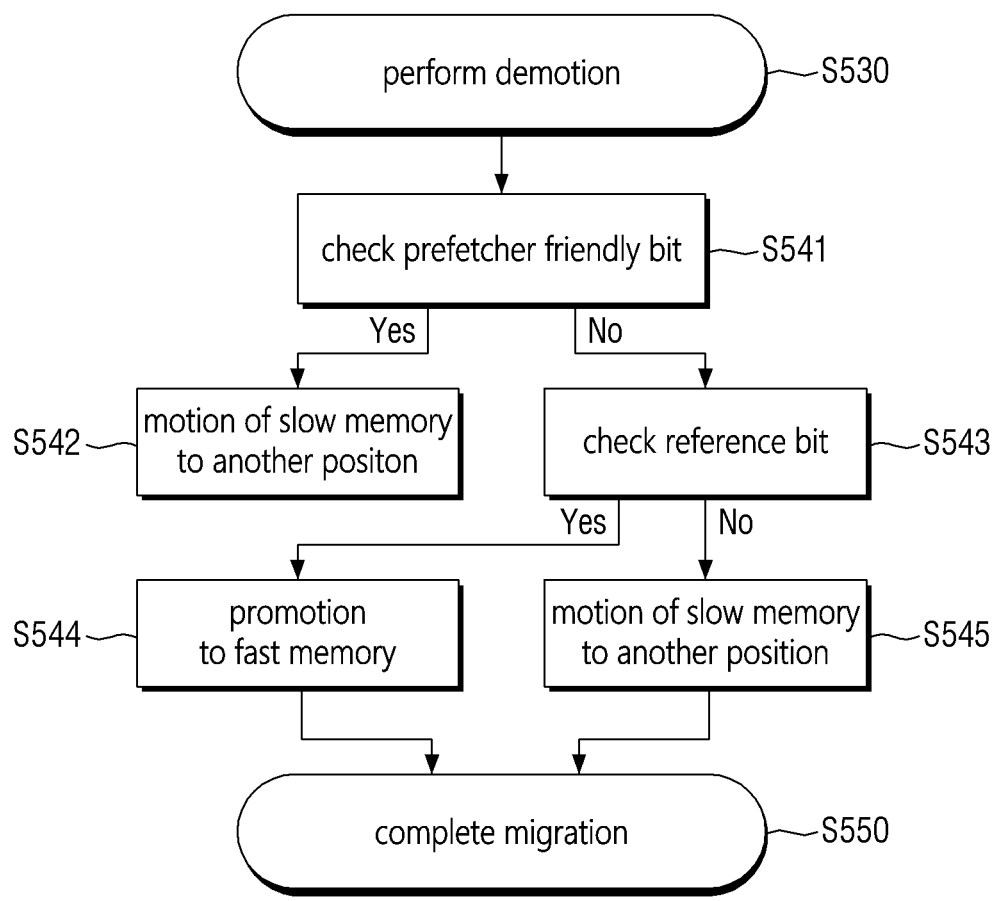
FIG. 8 is a flow chart illustrating a promotion operation of the operation of the migration module shown in FIG. 5.
Figure 9:
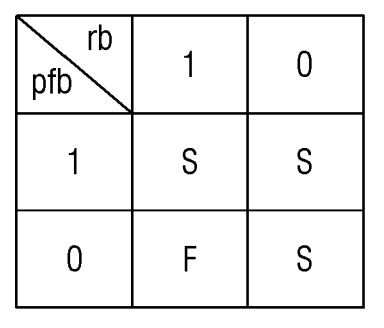

FIG. 8 is a flow chart illustrating a promotion operation of the operation of the migration module shown in FIG. 5. FIG. 9 is a view illustrating the promotion operation of FIG. 8.

Referring to FIGS. 3, 8 and 9, after demotion is performed (operation S530), the migration module 30 may determine whether to perform promotion with respect to the second area 3400 positioned at the head H of the second pointer area 340.

First, the migration module 30 may preferentially check the prefetcher friendly bit pfb of the second area 3400 positioned at the head H of the second pointer area 340 (operation S541).

Hereinafter, in case of the area having high prefetcher affinity, the value of the prefetcher friendly bit pfb is defined as 1, and in case of the area having low prefetcher affinity, the value of the prefetcher friendly bit pfb is defined as 0. In case of the area referenced by the processor (not shown), the value of the reference bit rb is defined as 1, and in case of the area that is not referenced by the processor (not shown), the value of the reference bit rb is defined as 0. However, in the present disclosure, both the prefetcher friendly bit pfb and the reference bit rb may be set differently.

When the value of the prefetcher friendly bit pfb of the second area 3400 is 1 (Yes branch from operation S541), the second area 3400 may move to another position of the second pointer area 340 regardless of the value of the reference bit rb (operation S542) (the case that the pfb value of FIG. 9 is 1). That is, promotion is not performed. This is because that performance degradation may be minimized as the case that the second area 3400 corresponds to an area having high prefetcher affinity even though the second area 3400 is positioned in the second pointer area 340 corresponding to a slow memory when the prefetcher friendly bit pfb is 1.

When the value of the prefetcher friendly bit pfb of the second area 3400 is 0 (No branch from operation S541), the reference bit rb is checked (operation S543).

When the value of reference bit rb is 1 (Yes branch from operation S543), the data of the second area 3400 corresponds to data referenced by the processor (not shown) and thus promotion may be performed for the first pointer area 320 (operation S544) (the case that the pfb value of FIG. 7 is 0 and the rb value is 1). Therefore, when the processor (not shown) accesses the same data later, faster access may be made.

When the value of the reference bit rb is 0 (No branch from operation S543), the second area 3400 may move to another position in the second pointer area without performing promotion to the first pointer area 320 (operation S545) (the case that the pfb value of FIG. 7 is 0 and the rb value is 0). This is because that the data of the second area 3400 is not required to be positioned in a fast memory as the data of the second area 3400 corresponds to the data that is not referenced by the processor (not shown) when the reference bit rb is 0. The migration module 30 may complete migration when promotion is completed (S550).

The migration module 30 may not perform promotion by preferentially determining the prefetcher friendly memory area, thereby making sure of capacity of the fast memory. Also, the prefetcher may be used so that performance degradation due to data subjected to demotion to the slow memory may be minimized. Therefore, performance of the processor may be improved in a heterogeneous memory environment.

Figure 10:
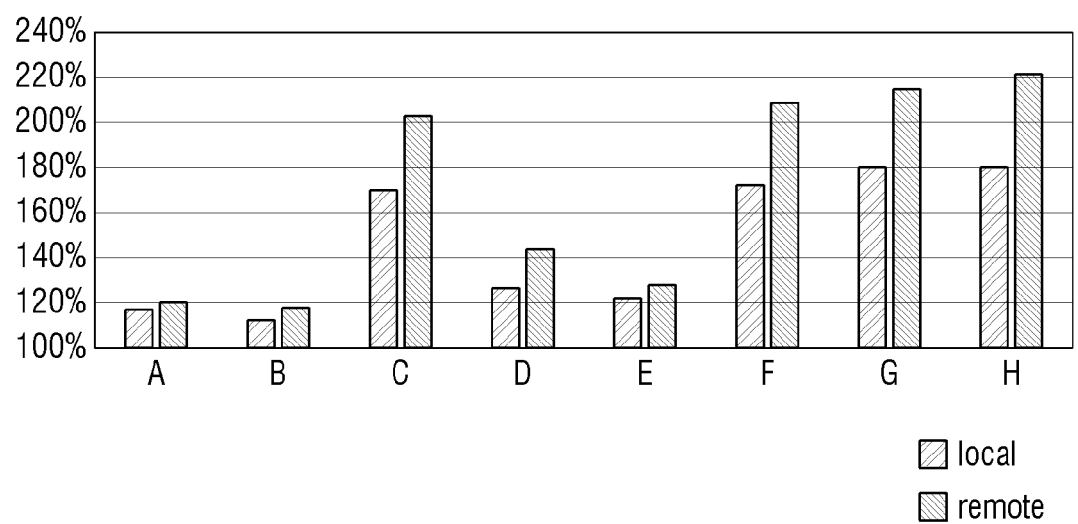
FIGS. 10 and 11 are views illustrating an effect of a memory system according to some embodiments.
Figure 11:
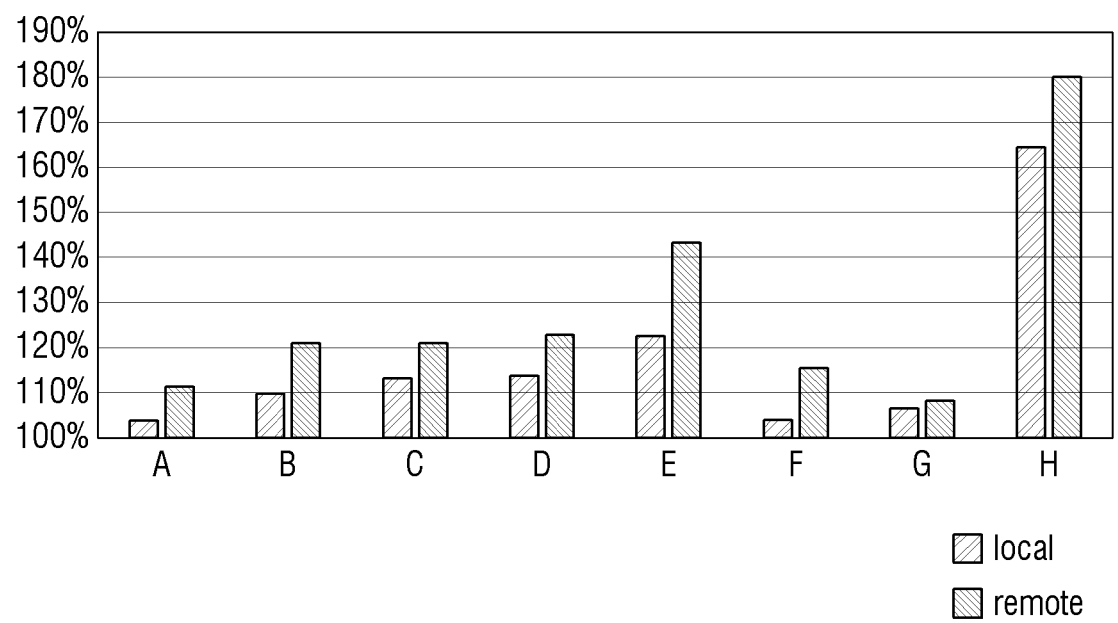

FIGS. 10 and 11 are views illustrating an effect of a memory system according to some embodiments.

Referring to FIG. 10, a graph indicating the degree of performance improvement due to the use of a prefetcher in a single core environment is shown. A horizontal axis represents a type of a benchmark (e.g., benchmark A, benchmark B, and so on), and a vertical axis represents the degree, in which performance in each benchmark is improved, as compared with the case that the prefetcher is not used.

A local memory may have an access time shorter than a remote memory. Therefore, the local memory may be a relatively fast memory, and the remote memory may be a relatively slow memory.

The prefetcher may be used in a single core environment, so that performance degradation of the processor may be mitigated (e.g., significantly mitigated).

A performance improvement effect may be greater when the prefetcher is used in the remote memory than when the prefetcher is used in the local memory. This may be because that performance degradation due to a long memory access time of the remote memory may be (e.g., significantly mitigated) by using the prefetcher.

Therefore, when the memory system 1 according to some embodiments of the present disclosure is used, the prefetcher friendly memory area may be detected in the heterogeneous memory environment and may be subjected to migration in advance, whereby performance degradation due to a long memory access time may be mitigated (e.g., significantly mitigated).

Referring to FIG. 11, a graph indicating the degree of performance improvement due to the use of the prefetcher in a multi-core environment is shown. A horizontal axis represents a type of a benchmark (e.g., benchmark A, benchmark B, and so on), and a vertical axis represents the degree, in which performance in each benchmark is improved, as compared with the case that the prefetcher is not used.

The prefetcher may be used even in the multi-core environment, so that performance degradation of the processor may be mitigated.

Also, a performance improvement effect may be greater when the prefetcher is used in the remote memory than when the prefetcher is used in the local memory. This is because that performance degradation due to a long memory access time of the remote memory may be mitigated (e.g., significantly mitigated) by using the prefetcher.

Therefore, when the memory system 1 according to some embodiments of the present disclosure is used, the prefetcher friendly memory area may be detected in the heterogeneous memory environment and may be subjected to migration in advance, whereby performance degradation due to a long memory access time may be mitigated (e.g., significantly mitigated).

Figure 12:
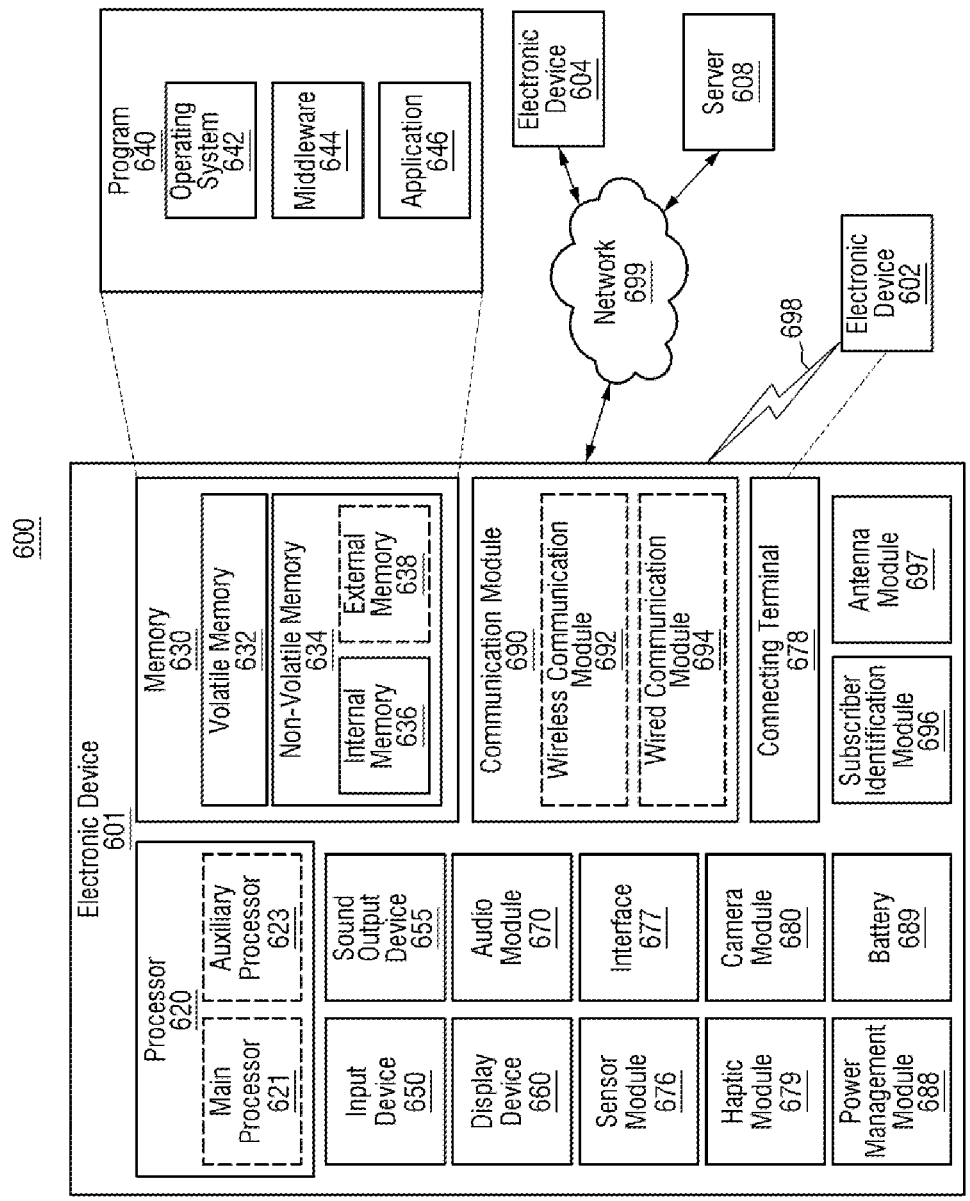
FIG. 12 is a block diagram illustrating an electronic device that includes the memory system shown in FIG. 1.

FIG. 12 is a block diagram illustrating an electronic device that includes the memory system shown in FIG. 1.

An electronic device 601 in a network environment 600 may perform communication with an electronic device 602 through a first network 698 such as a short-range wireless communication network, or may perform communication with an electronic device 604 or a server 608 through a second network 699 such as a long-range wireless communication network.

The electronic device 601 may perform communication with the electronic device 604 through the server 608. The electronic device 601 includes a processor 620, a memory 630, an input device 650, a sound output device 655, a display device 660, an audio module 670, a sensor module 676, an interface 677, a connecting terminal 678, a haptic module 679, a camera module 680, a power management module 688, a battery 689, a communication module 690, a subscriber identification module (SIM) 696, an antenna module 697 or the like.

In some embodiments, at least one of the components such as the display device 660 or the camera module 680 may be omitted from the electronic device 601, or one or more other components may be added to the electronic device 601.

In some embodiments, some of the components may be integrated into a single integrated circuit (IC). For example, the sensor module 676 may include a fingerprint sensor, an iris sensor and/or an illuminance sensor and may be embedded in the display device 660, such as a display.

The processor 620 may perform a variety of data processing or computations by executing software (e.g., program 640) that control other components of at least one electronic device 601 such as hardware or software components connected to the processor 620.

As at least a portion of data processing or computations, the processor 620 may load commands or data received from another component such as the sensor module 676 or the communication module 690 in a volatile memory 632, process the commands or data stored in the volatile memory 632 and store result data in a non-volatile memory 634.

The processor 620 may include a main processor 621 such as a central processing unit (CPU) or an application processor (AP), and an auxiliary processor 623 that may operate independently of the main processor 621 or operated as being associated with the main processor 621.

The auxiliary processor 623 may include, for example, a graphic processing unit (GPU), an image signal processor (ISP), a sensor hub processor or a communication processor (CP).

In some embodiments, the auxiliary processor 623 may be configured to consume less power than the main processor 621 or execute a particular function. The auxiliary processor 623 may be implemented separately from the main processor 621 or implemented as a portion of the main processor 621.

The auxiliary processor 623 may control at least some of functions or states related to at least one of the components of the electronic device 601 on behalf of the main processor 621 while the main processor 621 is in an inactive state and/or together with the main processor 621 while the main processor 621 is in an active state.

The memory 630 may store various data used for at least one component of the electronic device 601. The data may include, for example, software of the program 640, and input data and output data for commands related to the software. The memory 630 may include a volatile memory 632 or a non-volatile memory 634.

The program 640 may be stored as software in the memory 630, and may include, for example, an operating system (OS) 642, a middleware 644, or an application 646.

The input device 650 may receive commands or data that may be used by another component of the electronic device 601. The input device 650 may receive the commands or data from an outside of the electronic device 601, or a source external to the electronic device 601. The input device 650 may include, for example, a microphone, a mouse, or a keyboard.

The sound output device 655 may output a sound signal to the outside of the electronic device 601. The sound output device 655 may include, for example, a speaker. Multimedia data may be output through the speaker.

The display device 660 may provide information visually to the outside of the electronic device 601. The display device 660 may include, for example, a display, a hologram device or a projector, and a control circuit configured to control a corresponding one of the display, the hologram device or the projector.

In some embodiments, the display device 660 may include a touch circuit configured to sense a touch, or a sensor circuit, such as a pressure sensor, configured to measure strength of a force generated by the touch.

The audio module 670 may convert sound into an electrical signal, or vice versa. In some embodiments, the audio module 670 may obtain sound via the input device 650, or may output sound via the sound output device 655 or a headphone of the external electronic device 602 directly or wirelessly connected to the electronic device 601.

The sensor module 676 may sense an operating state (e.g., power or temperature) of the electronic device 601 or an external environment state (e.g., user state) of the electronic device 601, and may generate an electrical signal or data value corresponding to the sensed state. The sensor module 676 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 677 may support one or more prescribed protocols to be used by the electronic device 601 directly or wirelessly connected to the external electronic device 602. In some embodiments, the interface 677 may include, for example, a high definition multimedia interface (HDMI), a universal serial bus (USB) interface, a secure digital (SD) card interface, or an audio interface.

The connecting terminal 678 may include a connector through which the electronic device 601 may be physically connected to the external electronic device 602. In some embodiments, the connecting terminal 678 may include, for example, an HDMI connector, a USB connector, an SD card connector, or an audio connector (e.g., a headphone connector).

The haptic module 679 may convert an electrical signal into a mechanical stimulus, such as vibration or motion, which may be recognized by a user, through a tactile sensation or kinesthetic sensation. In some embodiments, the haptic module 679 may include, for example, a motor, a piezoelectric element, or an electrical stimulator.

The camera module 680 may capture a still image and motion images. In some embodiments, the camera module 680 may include one or more lenses, an image sensor, an image signal processor, or a flash.

The power management module 688 may manage a power supplied to the electronic device 601. For example, the power management module 688 may be implemented as at least a portion of a power management integrated circuit (PMIC), for example.

The battery 689 may supply a power to at least one component of the electronic device 601. According to some embodiments, the battery 689 may include, for example, a non-rechargeable primary battery, a rechargeable secondary battery, or a fuel cell.

The communication module 690 may support establishment of a direct communication channel or wireless communication channel between the electronic device 601 and the external electronic device (e.g., the electronic device 602, the electronic device 604, or the server 608), and may perform communication through the established communication channel.

The communication module 690 may include one or more communication processors that may be able to operate independently of the processor 620 and support direct communication or wireless communication.

In some embodiments, the communication module 690 may include a wireless communication module 692 such as a cellular communication module, a short-range wireless communication module or a global navigation satellite system (GNSS) communication module, or a wired communication module 694 such as a local area network (LAN) communication module or a power line communication (PLC) module.

A corresponding communication module of these communication modules may perform communication with the external electronic device via the first network 698 (e.g., Bluetooth™, wireless fidelity (Wi-Fi) direct or standard of the Infrared Data Association (IrDA)) or the second network 699 (e.g., a mobile communication network, Internet, a long-range communication network, etc.).

These various types of communication modules may be implemented as a single component, or may be implemented as a plurality of components separated from each other. The wireless communication module 692 may identify or authenticate the electronic device 601 within a communication network, such as the first network 698 or the second network 699, by using subscriber information (e.g., International Mobile Subscriber Identifier (IMSI)) stored in the subscriber identification module 696.

The antenna module 697 may transmit or receive a signal or power to or from the outside of the electronic device 601. In some embodiments, the antenna module 697 may include one or more antennas, and at least one antenna suitable for a communication scheme used in the communication network, such as the first network 698 or the second network 699, may be selected from the antennas by the communication module 690. A signal or power may be transmitted or received between the communication module and the external electronic device via the selected at least one antenna.

At least some of the components described above may be interconnected to communicate signals therebetween via an inter-peripheral communication scheme such as bus, general purpose input and output (GPIO), serial peripheral interface (SPI) and mobile industry processor interface (MIPI).

In some embodiments, commands or data may be transmitted or received between the electronic device 601 and an external electronic device 606 via the server 608 connected to the second network 699. The electronic devices 602 and 606 may be the same or different kinds of devices as or from the electronic device 601. All or some of the operations to be executed in the electronic device 601 may be executed in one or more external electronic devices 602, 606 or 608. For example, all or some of the operations to be executed in the electronic device 601 may be executed in one or more external electronic devices 602, 606 or 608.

For example, when the electronic device 601 needs to perform functions or services automatically or in response to a request from a user or another device, the electronic device 601 may request one or more external electronic devices to perform at least a portion of the functions or services instead of executing the functions or services by themselves. The one or more external electronic devices that have received the request may execute at least a portion of the requested functions or services, or an additional function or service associated with the request, and may forward the result of the execution to the electronic device 601. The electronic device 601 provides the result as at least a portion of the response to the request with or without additional process of the result. To this end, cloud computing, distributed computing or client-server computing technologies may be used, for example.

Although some embodiments of the present disclosure have been described with reference to the accompanying drawings, it will be apparent to those skilled in the art that the present disclosure can be fabricated in various forms without being limited to the above-described embodiments and can be embodied in other specific forms without departing from the technical spirit and essential characteristics. Thus, the above embodiments are to be considered in all respects as illustrative and not restrictive.

What is claimed is:

1. A memory system comprising:
a first memory;
a second memory having an operating speed different from that of the first memory;
a storage unit configured to store an instruction;
a prefetcher configured to update prefetcher data in response to occurrence of cache hits; and
a processor configured to execute the instruction stored in the storage unit,
wherein, when the instruction is executed by the processor, the processor is configured to:
generate prefetcher friendly data by filtering the prefetcher data,
set a prefetcher friendly bit in a first pointer area corresponding to the first memory and a second pointer area corresponding to the second memory based on the prefetcher friendly data, and
migrate first data in the first pointer area to the second pointer area or maintain the first data in the first pointer area, in consideration of a reference bit and the prefetcher friendly bit of the first and second pointer areas, and
migrate second data in the second pointer area to the first pointer area or maintain the second data in the second pointer area, in consideration of the reference bit and the prefetcher friendly bit of the first and second pointer areas.

2. The memory system of claim 1, wherein the processor comprises the prefetcher.

3. The memory system of claim 1, wherein the prefetcher data is stored in accordance with a Misra-Gries algorithm.

4. The memory system of claim 1, wherein the prefetcher friendly data is data, in which a number of the cache hits is equal to or greater than a threshold value, among the prefetcher data.

5. The memory system of claim 4, wherein the processor is configured to update the prefetcher friendly data based on an analysis cycle occurring.

6. The memory system of claim 5, wherein the prefetcher friendly bit is reset on a predetermined cycle during the execution of the instruction.

7. The memory system of claim 1, wherein the reference bit indicates whether data in the first or second memory has been referenced by the processor.

8. The memory system of claim 1, further comprising a migration module configured to move a first area positioned at a tail of the first pointer area to a position of the second pointer area in response to the prefetcher friendly bit having a first value.

9. The memory system of claim 1, wherein the first memory is a dynamic random-access memory (DRAM), and the second memory is a Compute Express Link (CXL).

10. A method for operating a memory system comprising a first memory and a second memory having an operating speed different from that of the first memory, the method comprising:
updating prefetcher data by a prefetcher in response to occurrence of cache hits;
generating, by a monitor module, prefetcher friendly data by filtering the prefetcher data, and providing, by the monitor module, the generated prefetcher friendly data to a migration module;
setting, by the migration module and based on the prefetcher friendly data, a prefetcher friendly bit in a first pointer area corresponding to the first memory and a second pointer area corresponding to the second memory;
migrating first data in the first pointer area to the second pointer area or maintaining the first data in the first pointer area by the migration module, in consideration of a reference bit and the prefetcher friendly bit of the first and second pointer areas; and
migrating second data in the second pointer area to the first pointer area or maintaining the second data in the second pointer area by the migration module, in consideration of the reference bit and the prefetcher friendly bit of the first and second pointer areas.

11. The method of claim 10, wherein the prefetcher friendly data is data, in which a number of the cache hits is equal to or greater than a threshold value, among the prefetcher data.

12. The method of claim 11, wherein the prefetcher friendly data is updated based on an analysis cycle occurring.

13. The method of claim 12, wherein the prefetcher friendly bit is reset on a predetermined cycle.

14. The method of claim 11, wherein the reference bit indicates whether data in the first or second memory has been referenced.

15. The method of claim 14, wherein the migrating the first data comprises moving, by the migration module, a first area positioned at a tail of the first pointer area to a position of the second pointer area in response to the prefetcher friendly bit that is a first value and the reference bit that is a third value.

16. The method of claim 15, further comprising changing the reference bit to a fourth value different from the third value in response to motion of the first area to the position of the second pointer area.

17. The method of claim 15, where the position of the second pointer area is a first position, and wherein the method further comprises moving the first area positioned at a tail of the first pointer area to a second position of the second pointer area in response to the prefetcher friendly bit that is a first value and the reference bit that is a fourth value different from the third value.

18. The method of claim 14, wherein the migrating the second data comprises moving, by the migration module, a second area positioned at a head of the second pointer area to a position of the second pointer area in response to the prefetcher friendly bit that is a first value and the reference bit that is a third value.

19. A method for operating a memory system comprising a first memory and a second memory having an operating speed different from that of the first memory, the method comprising:
    updating prefetcher data by a prefetcher in response to occurrence of cache hits;
    updating, by a migration module, a prefetcher friendly bit indicating whether a value of the cache hits occurring in a first pointer area corresponding to the first memory and a second pointer area corresponding to the second memory is equal to or greater than a threshold value; and
    determining, by the migration module, whether data in the first pointer area or the second pointer area is migrated, in consideration of a reference bit indicating data in the first or second memory has been referenced and the prefetcher friendly bit; and
    migrating, by the migration module, the data to the first pointer area or the second pointer area based on the determining.

20. The method of claim 19, wherein the first memory is a dynamic random-access memory (DRAM), and
    the second memory is a Compute Express Link (CXL).

* * * * *